United States Patent [19]
Yoshizawa et al.

[11] Patent Number: 5,551,858
[45] Date of Patent: Sep. 3, 1996

[54] APPARATUS FOR FORMING SYNTHETIC RESINS

[75] Inventors: Yukio Yoshizawa; Sumio Sato; Masaki Ogawa, all of Nagaoka; Masakazu Ohno, Tokyo, all of Japan

[73] Assignees: Niigata Engineering Company, Ltd.; Sankyokasei Kabushiki Kaisha, both of Tokyo, Japan

[21] Appl. No.: 299,908

[22] Filed: Sep. 1, 1994

[30] Foreign Application Priority Data

Oct. 8, 1993 [JP] Japan .................................. 5-253508

[51] Int. Cl.$^6$ .................................................. B29C 45/38
[52] U.S. Cl. .......................... 425/217; 264/37; 264/161; 264/328.9; 264/334; 425/554; 425/562; 425/567
[58] Field of Search .............................. 264/328.8, 328.9, 264/328.11, 328.15, 334, 161, DIG. 69; 425/549, 554, 556, 562, 564, 565, 567, 568

[56] References Cited

U.S. PATENT DOCUMENTS 2,613,395 10/1952 Massler .
2,698,460 1/1955 Amo .
2,698,464 1/1955 Wilson .

FOREIGN PATENT DOCUMENTS 0620097 10/1994 European Pat. Off. .

*Primary Examiner*—Jill L. Heitbrink
*Attorney, Agent, or Firm*—Scully, Scott, Murphy & Presser

[57] ABSTRACT

An improved injection molding apparatus having a fixed mold 7 having a molten resin passage 16b and a movable second mold 8 having a molten resin passage 18 is presented in which residual hardened resin left in molten resin passages of the injection apparatus is removed automatically after every injection operation. The invented device is provided with a reciprocating member 34 which is coupled in molten resin passages 16b, 18, and during the injection step, the molten resin passage 16b is extended to the molten resin passage 18 by moving the reciprocating member 34 into the second mold to communicate a mold cavity 17 with a resin injection device 14. After the completion of the injection step, the reciprocating member 34 is moved to the back position to remove any resin left in the molten resin passage towards the first mold. The mold is then opened to separate the fixed mold 7 from the movable mold 8, leaving the reciprocating member 34 in the first mold so as to close off the opening of the molten resin passage 18. When the molds 16b, 18 are separated, this arrangement is effective in preventing exposing the passages 16b, 18 to ambient atmosphere, leading to leaking of molten resin from the passage 16b as well as preventing inclusion of air in molded products to cause a phenomenon called burning.

26 Claims, 14 Drawing Sheets

APPARATUS FOR FORMING SYNTHETIC RESINS

BACKGROUND OF THE INVENTION

1. Field of the Invention

The present invention relates to an improved method and apparatus for making a molded product in which a molten resin is transported by a resin injection device into a mold cavity, comprised by a first mold having a molten resin passage and a second mold having the product cavity.

2. Background of the Invention

A synthetic resin forming apparatus in general use to produce resin products operates by molten resin by means of a resin injection device into a mold cavity, comprising a first mold and a second mold, through a molten resin passage disposed on the first mold. In such a resin forming apparatus, there is a need to reduce the formation of unwanted debris formed by the hardened residual molten resin left in the molten resin passage. For solving such a problem, the present inventors had created a mold design in which the molten resin passage is extended to the second mold, and, at the same time, a moving device is provided as a unit with the second mold such that a rod-shaped member operates in the molten resin passages to move back and forth in the molten resin passages.

The design of this type of resin molding apparatus is such that, in the retracted condition of the rod member of the moving device, the rod member is disposed in the molten resin passage of the second mold, and the molding cavity is communicated with the resin injection device. In the forward condition of the rod member, the rod member is disposed such that it projects into the molten resin passage of the first mold. Accordingly, when performing an injection operation, the rod member is retracted so that the resin can be injected into the mold cavity by the resin injection device, and after the injection operation has been completed, the rod member is thrust forth to return any residual resin left in the molten resin passage towards the resin injection device.

However, in a resin forming apparatus of this design, because the rod member is disposed integrally with the transfer device on the second mold side, when the first mold is separated from the second mold, after the completion of the injection operation, the rod member is disengaged from the first mold. This will expose the molten resin passage to ambient air, and molten resin flows out of the open exposure.

Further in the above apparatus, because the molten resin passage of the first mold becomes open as a result of the first mold being separated from the second mold, there is a chance of accumulating unwanted air in the molten resin passage. If the next molding operation is performed in this condition, the air is sometimes pumped into the mold cavity before the resin is charged, and if this happens, the air becomes compressed in the mold cavity by the molten resin thus generating high temperature in the molded product. The causes a phenomenon called burning in the product.

SUMMARY OF THE INVENTION

In an injection process, it is necessary to separate a fixed first mold from a movable second mold for removing a molded resin product from a resin cavity comprised of the first mold and the second mold. In so doing, a molten resin passage disposed in the first mold becomes exposed to the environment, and leaking of the molten resin as well as accumulation of unwanted air can occur. An objective of the present invention is to present a method for preventing leaking of the molten resin as well as the generation of burning in the molded product caused by the accumulated air being injected into the mold cavity along with the molten resin. A second objective of the present invention is to present a device for the injection apparatus which achieves the first objective.

Accordingly, a method is presented for forming synthetic resin products by using a synthetic resin product forming apparatus comprising a first mold; a separable second mold; an injection device communicating with said first mold; comprising the steps of: injecting molten resin in a mold cavity, comprising said first mold and said second mold, through a molten resin passage to form a molded resin product; and removing said molded resin product from said mold cavity;

wherein said molten resin passage extends from said first mold to said second mold;

an independent reciprocating member is disposed wholly or partially in said first mold during an injection stage, and moves through said molten resin passage to said second mold by the force of said molten resin being injected into said mold cavity; and after the completion of said injection stage, said reciprocating member is moved wholly or partially to said first mold and said first mold is separated from said second mold, thereby returning resin remaining in said molten resin passage to said injection device, and preventing molten resin from leaking from said first mold by disposing said reciprocating member wholly or partially in said first mold.

The second objective is achieved in a synthetic resin product forming apparatus for making molded resin products by delivering molten resin to a separable mold cavity comprised of a first mold and a separable second mold, by means of an injection device communicating with said first mold through a molten resin passage provided in said first mold, characterized by having a moving device having:

means for extending said molten resin passage to said second mold;

means for coupling an independent reciprocating member inside said molten resin passage, wherein said reciprocating member moves between an injection position functioning to communicate said mold cavity with said molten resin passage, located in said second mold, and a back position wholly or partially located on said first mold;

means for moving said reciprocating member to said back position;

wherein said reciprocating member is disposed wholly or partially in said first mold when said first mold is separated from said second mold so as to remove a molded resin product from said mold cavity.

According to the present invention, in the injection stage of the resin injection process, the reciprocating member freely movably disposed in the molten resin passage is pushed by the force of the molten resin being injected into the mold cavity, and moves to the second mold. The result is the communication between the mold cavity and the resin injection device, thus fulling the mold cavity with the molten resin. After the completion of the injection stage, the reciprocating member is moved back to the first mold and in so doing, the residual resin in the molten resin passage is returned to the injection device. When the first and second molds are separated, because the reciprocating member is independently disposed in the molten resin passage, the reciprocating member can be left in the first mold so as to seal the molten resin passage in the first mold.

This action of the reciprocating member is effective in preventing the molten resin from leaking out of the molten resin passage in the first mold as well as preventing accumulation of unwanted air in the molten resin passage, and a generation of heat caused by the compression of the accumulated air during the subsequent injection operation.

BRIEF EXPLANATION OF THE DRAWINGS

FIG. 4 is a cross sectional view of the main section of the apparatus shown in FIG. 1, and corresponds to a state of the movable member being pushed in.

FIG. 12 is a cross sectional view of the main elements, and corresponds to a state of the movable member being pushed in.

PREFERRED EMBODIMENTS OF THE INVENTION

A first embodiment will be explained with reference to FIGS. 1 to 9.

Figure 1:
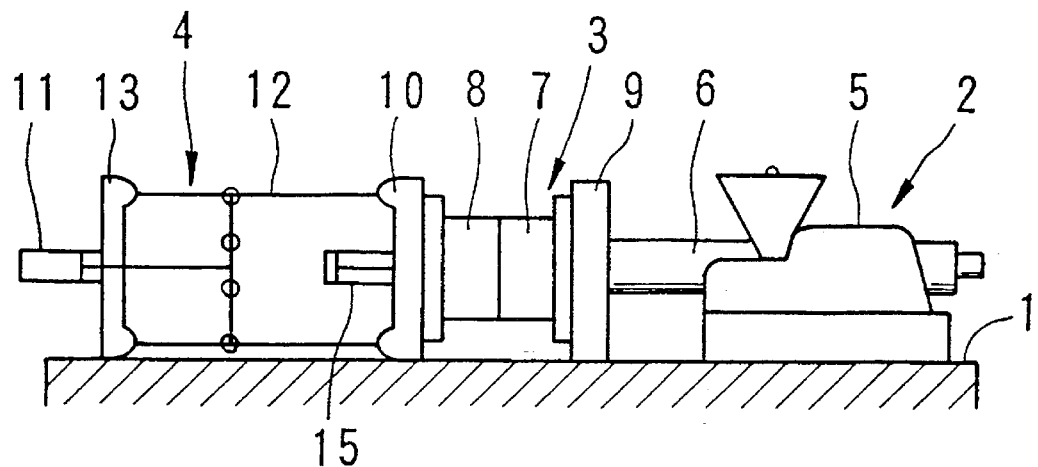
FIG. 1 is a front view of a first embodiment of a closed mold of an injection molding apparatus of the present invention.

FIG. 1 shows a first embodiment of a horizontal injection apparatus of an in-line screw type. The injection apparatus has a machine base 1, an injection device 2, a molding device 3 and a mold pressing device 4 which are disposed on the machine base 1. The injection device 2 is made up primarily of an injection cylinder 5 and a heating cylinder 6. The molding device 3 comprises a fixed mold (a first mold) 7 attached to a fixed block 9 which is fixed on the machine base 1, and a movable mold (a second mold) 8 attached to a movable block 10 which is movably fixed on the machine base 1. The fixed block 7 and the movable block 8 are disposed so as to oppose each other. The mold pressing device 4 has a hydraulic cylinder 11 for pressing on the mold, and a toggle device 12, and performs closing of the mold by moving the movable block 10 towards the fixed block 9, or performs opening of the mold by moving the movable block 10 away from the fixed block 9.

The hydraulic cylinder 11 and the toggle device 12 are provided on an end plate 13 which is firmly connected to the fixed block 9 through a plurality of tie-rods (not shown). The movable block 10 moves along the tie-rods.

As shown in FIGS. 2 to 6, the fixed block 9 is provided with a nozzle section 20, disposed at the tip of the heating cylinder 6 extending in the direction of motion of the movable mold 8. The nozzle section 20 is maintained at a temperature to keep the resin in a molten state.

A screw 14, which acts as the device for injecting the resin, is disposed at a location slightly inside of the opening edge of the nozzle section 20. The screw 14 is rotated by a hydraulic motor 35 shown in FIG. 7, and is moved back and forth along the direction of motion of the movable mold 8 by means of the injection cylinder 5 so as to inject the molten resin. The nozzle section 20 can also be moved back and forth in the direction of motion of the movable mold 8 by means of a feed cylinder 31.

The fixed mold 7 has a mating surface 7a disposed at right angles to the direction of motion of the movable mold 8 to mate with the movable mold 8. The fixed mold 7 has a hole section 16a, at right angles to the mating surface 7a, which has the same diameter as and is coaxial with the inner surface section 20a of the nozzle section 20. The inner surface section 20a of the nozzle section 20 and the hole section 16a constitute the molten resin passage 18 in the fixed mold 7.

The movable mold 8 has a mating surface 8a which contacts the mating surface 7a of the fixed mold 7, and the mating surface 8a is provided with a depression section 19 directed from the mating surface 8a in the direction away from the fixed mold 7. When the movable mold 8 and the fixed mold 7 are closed together, the depression section 19 and the mating surface 7a of the fixed mold 7 define a mold cavity 17. The depression section 19 comprises a first depression section 19a and a second depression section 19b, for example.

The first depression section 19a extends outwards radially from the point opposing the hole section 16a. The second depression section 19b is disposed radially outside of the first depression section 19a, and has a depth, measured from the mating surface 8a, which is deeper than that of the first depression section 19a by a specific amount. The space formed by the second depression section 19b and the mating surface 7a of the fixed mold 7 corresponds to the shape of the final molded product. The space formed by the first depression section 19a and the mating surface 7a of the fixed mold 7 forms a gate for injecting the molten resin into the second depression section 19b, and corresponds to waste materials. The boundary sections between the second depression section 19b and the first depression section 19a are provided with protrusion parts 19c for facilitating separation of the formed product 24 and the waste by-product 26.

In the first embodiment, the movable mold 8 is provided with a hole section 16b. The hole section 16b has the same diameter as and is coaxial with the hole section 16a formed on the fixed mold 7 so as to be contiguous with each other. The hole section 16b extends away from the screw 14 beyond the opening of the hole section 16b formed on the mold cavity 17. The hole section 16b constitutes the molten resin passage for the movable mold 8.

The movable mold 8 is provided with a moving device (moving means) 27 for moving back and forth in the hole section 16b opposite to the fixed mold 7. The moving device 27 comprises a first ejection plate 21 disposed in the space communicating with the hole section 16b which is provided with an action pin 22, extending towards the fixed mold 7, which freely movably engages with the hole section 16b. Opposite to the first ejection plate 21, a hydraulically-operated ejector 15a is provided. The ejector 15a is a piston rod for the hydraulic eject cylinder 15 disposed on the movable mold 8.

The moving device 27 advances the ejector 15a, the first ejection plate 21 and the action pin 22 formed on the ejection plate 21 towards the fixed mold 7 when the eject cylinder 15 is pressurized. Conversely, the moving device 27 retracts the ejector 15a, the first ejection plate 21 and the action pin 22 when the fluid is drained from the eject cylinder 15.

A second ejection plate 23 associated with the first ejection plate 21 is provided near the fixed mold 7. The second ejection plate 23 has a central hole section 23a for passing the action pin 22 therethrough, and a plurality of ejection pins 25 extending towards the fixed mold 7. The ejection pins 25 freely movably engages with the hole section 25a formed through the movable mold 8 and communicating with the second depression section 19b.

The second ejection plate 23 touches the first ejection plate 21 when the first ejection plate 21 moves a specific distance towards the fixed mold 7. When the first ejection plate moves further towards the fixed mold 7, the second ejection plate 23 moves together with the first ejection plate 21 by being pushed by the first ejection plate 21 towards the fixed mold 7. The result is that the ejection pins 25 protrude into the mold cavity 17, and separate the molded product 24 from the movable mold 8. Therefore, it can be seen that the second ejection plate 21, together with the ejection cylinder 15 and the first ejection plate 21, constitute a hydraulic ejection device 28. Therefore, the ejection cylinder 15 performs a dual duty of operating the moving device 27 as well as the ejection device 28.

In the first embodiment, an independent cylindrical reciprocating member 34 is freely movably engaged in the molten resin passages 16b, 18. The outer diameter of the reciprocating member 34 is made smaller than the inner diameter of the molten resin passages 16b, 18 by the smallest necessary amount to permit the reciprocating member 34 to move freely inside the passages 16b, 18.

The length of the reciprocating member 34 and the stroke distance of first ejection plate 21 and the action pin 22 operated by the ejection cylinder 15 of the moving device 27 are determined by the relationship described below.

When one end of the reciprocating member 34 is in contact with the action pin 22 of the first ejection plate 21, when the ejection plate 21 is at the farthest point from the fixed mold 7 (which corresponds to the state shown in FIG. 3), the other end of the reciprocating member 34 is retracted from the first depression section 19a at a distance L1 towards the action pin 22. This location of the reciprocating member 34 is defined as the injection position. There is another position of the reciprocating member 34 which is defined as the back position. The back position of the reciprocating member is as follows. The ejection pins 25 attached to the second ejection plate 23 are not projecting into the mold cavity 17 in this position, and the second ejection plate 23 is in contact with the first ejection plate 21. The one end of the reciprocating member 34 is touching the tip of the action pin 22 of the first ejection plate 21 (the state shown in FIG. 4), and is positioned slightly towards action pin 22 beyond the first cavity section 19a, and the other end of the reciprocating member 34 is roughly coincident with the edge of the opening of the nozzle section 20.

Figure 6:
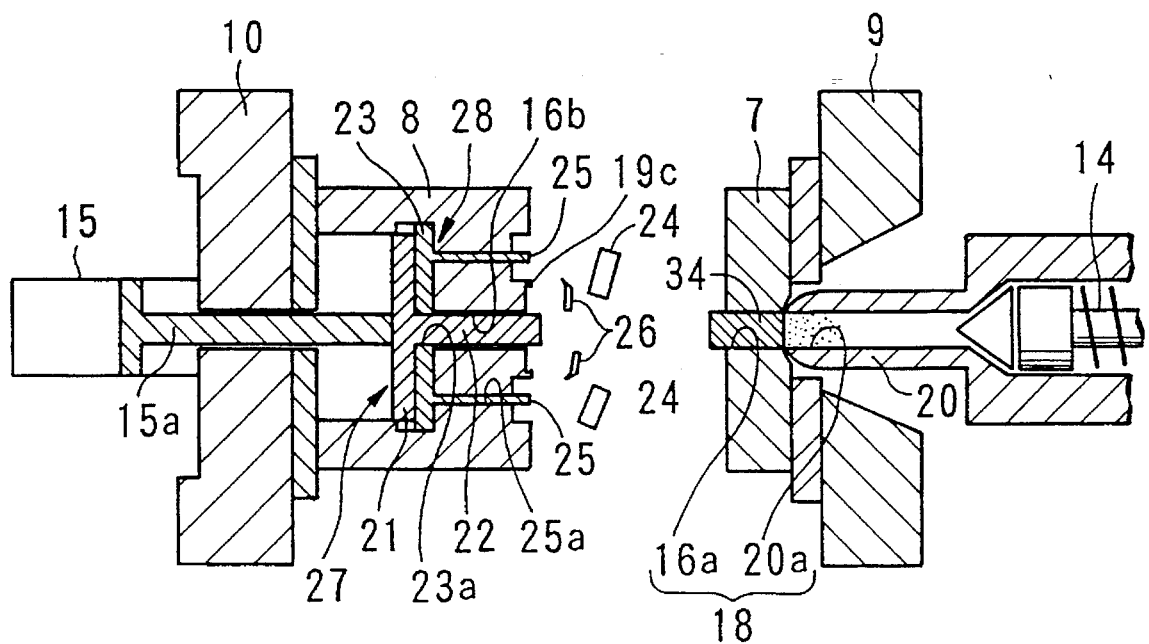
FIG. 6 is a cross sectional view of the main section of the apparatus shown in FIG. 1, and corresponds to a state of the mold being opened.

The reciprocating member 34 is positioned so that part of it will remain in the fixed mold 7 when the molds are separated. For example, when the reciprocating member 34 is in the back position, more than a half of the reciprocating member 34 remains in the fixed mold 7, as shown in FIG. 6. When the molds are separated, to make certain that the reciprocating member 34 to remain in the fixed mold 7, it is also possible to enlarge the diameter of the molten resin passage 16b of the movable mold 8 in comparison to the diameter of the molten resin passage 18 of the fixed mold 7. The reciprocating member 34 then remains in the molten resin passage having a smaller diameter.

When the molded product is to be ejected, the molds are opened by separating the movable mold 8 from the fixed mold 7, and activating the ejection cylinder 15 towards the fixed mold 7. By so doing, the second ejection plate 23, to which the first ejection plate 21 is bearing against, is pressed and both are moved together. The result is that the ejection pins 25 project out into the mold cavity 17, and separates the molded product 24 from the movable mold 8.

Next, the hydraulic circuit of the control device for the injection molding apparatus will be explained with reference to FIGS. 7 and 8.

Figure 7:
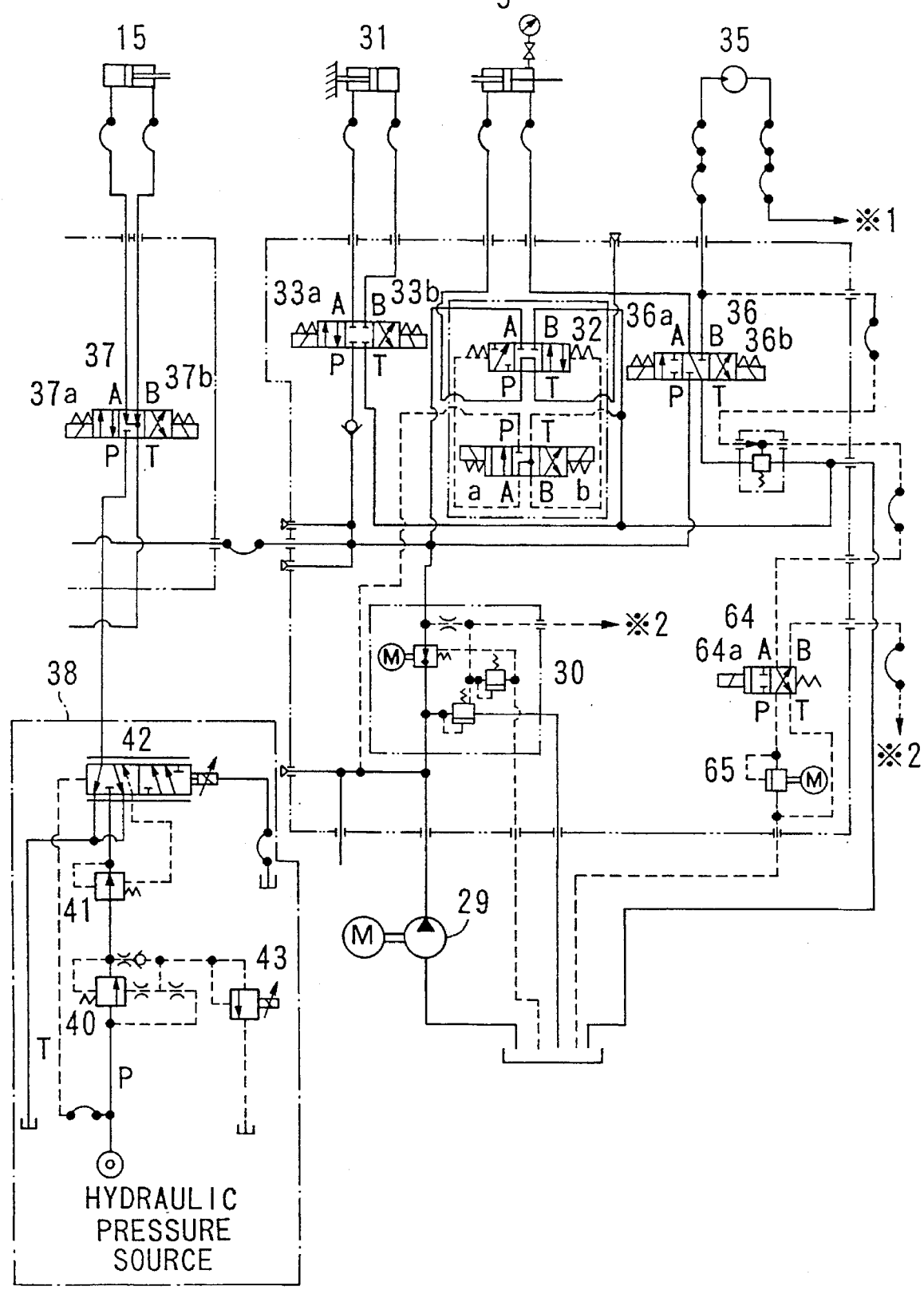
FIG. 7 shows the main elements in the fluid pressure circuit of the control device for the injection molding apparatus of the first embodiment.

In FIG. 7, the fluid supplied from the pressure pump 29 is adjusted for its flow rate by an electromagnetic flow control valve 30, after which it is branched into a feed cylinder 31 for controlling the motion of nozzle 20 for the molds 7, 8, the injection cylinder 5 and a hydraulic motor 35 for rotating the screw.

Figure 9:
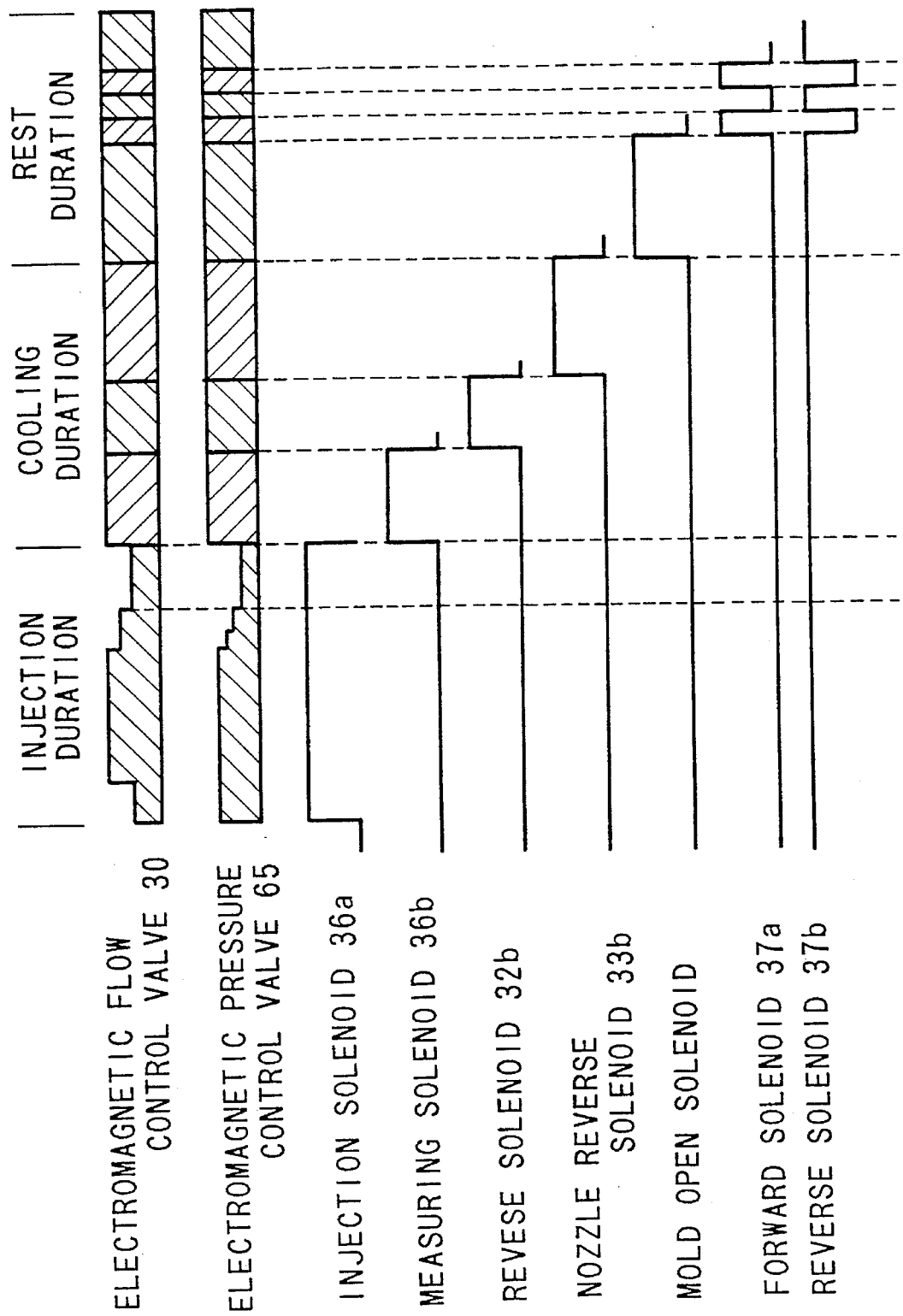
FIG. 9 shows a general timing chart for each of the actuators during the injection molding process.
Figure 10:
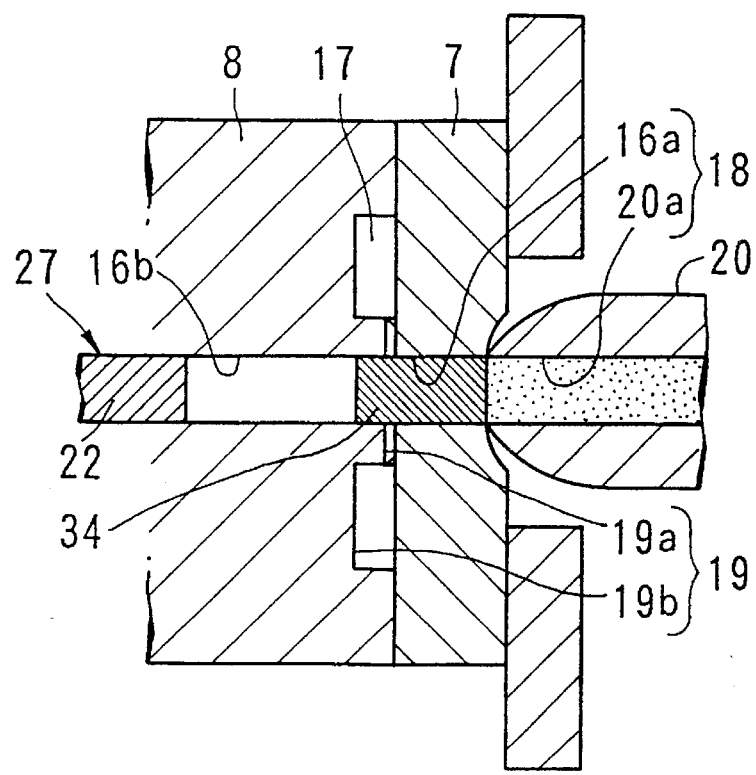
FIG. 10 is a front view of the main elements of a closed mold of a second embodiment of an injection molding apparatus of the present invention, and corresponds to an initial state before the injection step.
Figure 11:
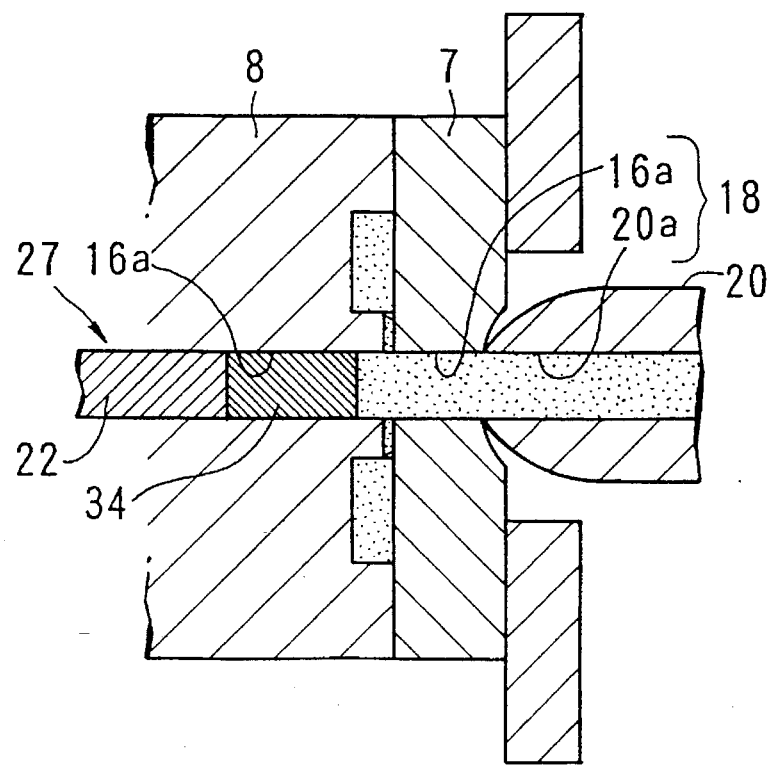
FIG. 11 is a cross sectional view of the main elements, and corresponds to a state of performing the injection step.
Figure 12:
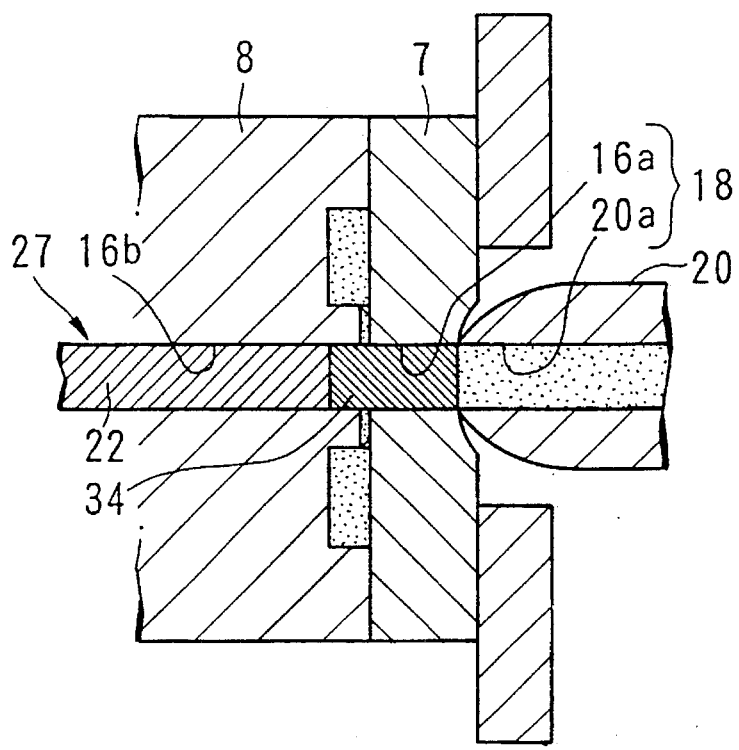
Figure 13:
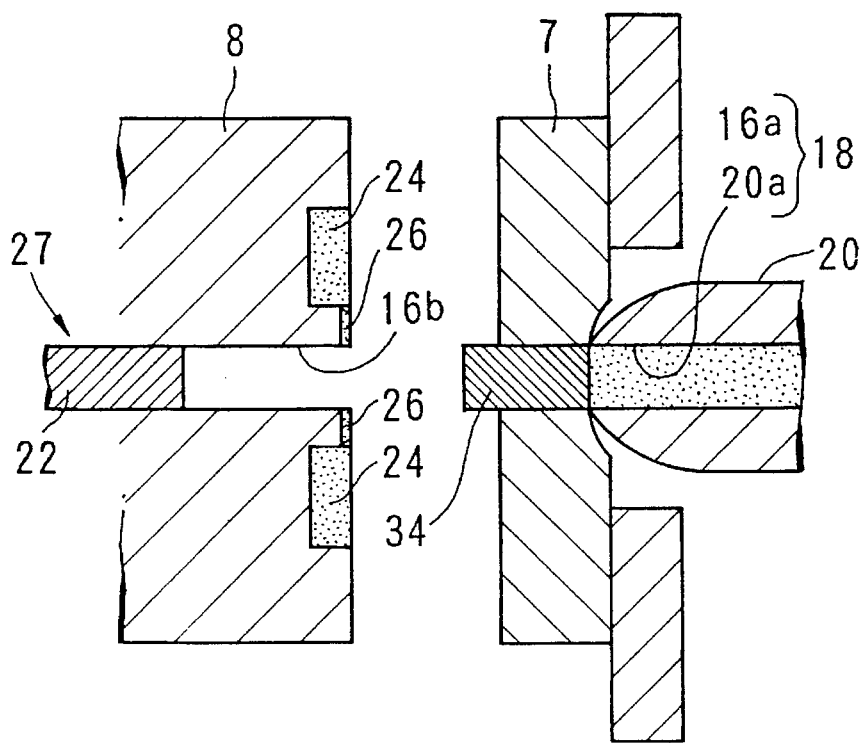
FIG. 13 is a cross sectional view of the main elements, and corresponds to a state of open mold after the transport device has moved to the initial position after pushing in the movable member.

The electromagnetic (shortened to em) flow control valve 30 is able to provide a multi-level speed control (e.g. four levels) the flow rate of the pressure fluid, particularly for injection cylinder 5 to conform to those shown in the timing chart in FIG. 9 in accordance with the injection times. The em valves 32, 33 and 36 are, respectively, disposed in the circuit between the branching point and the injection cylinder 5, the motor 35 and the feed cylinder 31. The em valves 32, 33 are able to change the acting direction of the injection cylinders 5, 31.

There is also an em pressure control valve 65 which is able to provide a multi-level pressure control (e.g. four levels). The pressure control valve 65 is connected to em flow control valve 30 via an em valve 64. For this reason, the fluid pressure supplied to the injection cylinder 5 from the em flow control valve 30 is able to be controlled in four levels to provide appropriate injection speeds (flow rate) and fluid pressures.

The fluid circuit for the ejection cylinder 15 is provided separately from the above-mentioned hydraulic pressure source, and comprises a switching em valve 37 and a control section 38 for changing the forward and reverse direction of motion of the ejection 15a and controlling the speed thereof. The switching em valve 37 has a forward solenoid 37a for moving the ejector 15a forward and a reverse solenoid 37b for reversing the ejector 15a, and switching em valve 37 is controlled by the on/off action of the reverse solenoid 37b and the forward solenoid 37a.

The control section 38 comprises a pressure reducing valve 40 which is connected to a pressure source, and the pressure regulated by the pressure reducing valve 40 is introduced in the em flow control valve 42 via the pressure compensation valve 41. The speed of the ejector 15a is selected by the em flow control valve 42. The fluid pressure controlled by the em flow control valve 42 is transmitted to the switching em valve 37. Also, the pressure reducing valve 40 is connected to an em relief valve 43.

Figure 8:
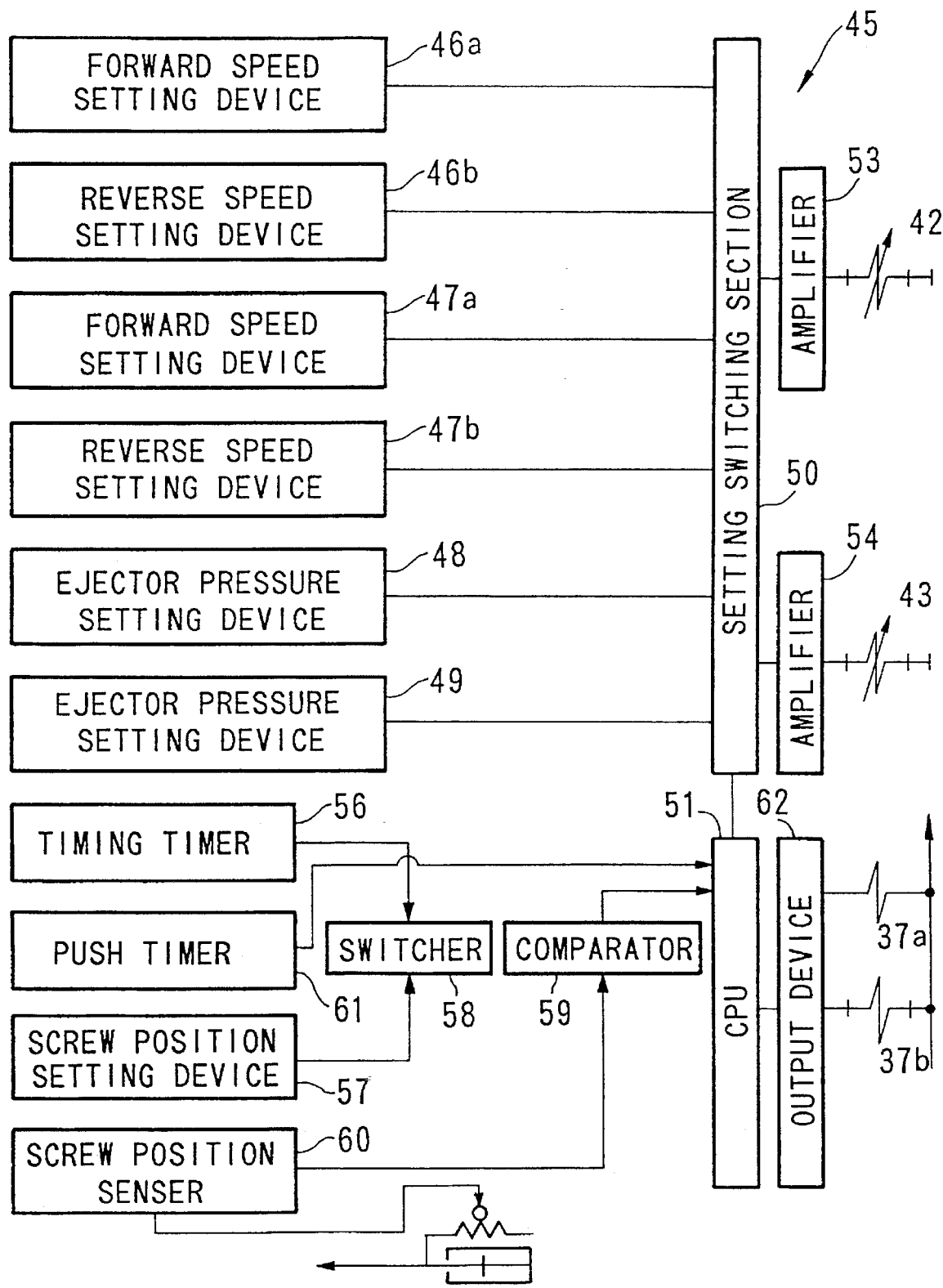
FIG. 8 is a block diagram of the control device for FIG. 7.

The operation of the ejection cylinder 15 is controlled by a pressure control device 45 shown in FIG. 8.

The pressure control device 45 comprises: a forward speed setting device 46a for controlling the forward speed of the ejector 15a during the product ejection stage; a reverse speed setting device 46b for controlling the reverse speed of the ejector 15a during the product ejection stage; an ejector forward speed setting device 47a for controlling the forward speed of the ejector 15a during the pushing stage of the reciprocating member 34 during the pushing stage of the reciprocating member 34 to the back position; an ejector reverse setting device 47b for controlling the reverse speed of the ejector 15a during the pushing stage of the reciprocating member 34; an ejector pressure setting device 48 for controlling the pressure applied to the ejector 15a during the ejection of the molded product; an ejector pressure setting device 49 for controlling the pressure applied to the ejector 15a during the pushing stage of the reciprocating member 34. All of these components are electrically connected to a setting switching section 50. The setting switching section 50 is electrically connected to a CPU 51 of the injection apparatus.

The operating speed of the ejector 15a during the pushing stage of the reciprocating member 34 is selected to be higher than the operating speed of the ejector 15a during the product ejection stage. By this arrangement, residual resin is quickly returned to the nozzle 20 and is melted.

The fluid flow rate is controlled by the em flow control valve 42 in accordance with the signals determined by the setting switching section 50 and amplified by the amplifier 53, depending on wether the process step is in the product ejection stage or the pushing stage for the reciprocating member 34. Similarly, the fluid pressure is controlled by the em relief valve 43 in accordance with the signals made in the setting switching section 50 and amplified by the amplifier 54, depending on whether the process step is in the product ejection stage or the pushing stage for the reciprocating member 34.

Next, the timing of the pushing stage for the reciprocating member 34 is controlled by a timing timer 56, and the position of the screw at the time of initiating the pushing stage for the reciprocating member 34 is determined by the screw position setting device 57. These devices are electrically connected to a switcher 58.

Further, triggering data, for determining the timing of initiating the pushing stage of the reciprocating member 34, are usually selected from one of the three methods: detection of the position of the screw 14, measurement of the injection time, or a combination of the two. The selection of which method is to be selected is made by the timing timer 56. The switcher 58 is connected to a comparator 59. The comparator 59 receives signals from the screw position setting device 57 at the time of initiating pushing stage of the reciprocating member 34, and from a screw position sensor 60. These signals are compared with the signals indicating the position of the screw from the screw position setting device 57. The output signal from the comparator 59 and the signal from the push timer 61 for measuring the duration of pushing stage for the reciprocating member 34 are both entered into CPU 51, and when the detected position coincides with the set position of the screw, CPU 51 command that the reciprocating member 34 to begin pushing, and begins measurement of the duration of pushing stage of the reciprocating member 34.

CPU 51 commands the output device 62 to output signals to the forward solenoid 37a or to the reverse solenoid 37b for operating the ejector 15a.

The operation of the first embodiment of the structure presented above will be explained with reference to FIGS. 2 to 6 which present illustrations of pushing stage or ejection stage of the reciprocating member.

Figure 2:
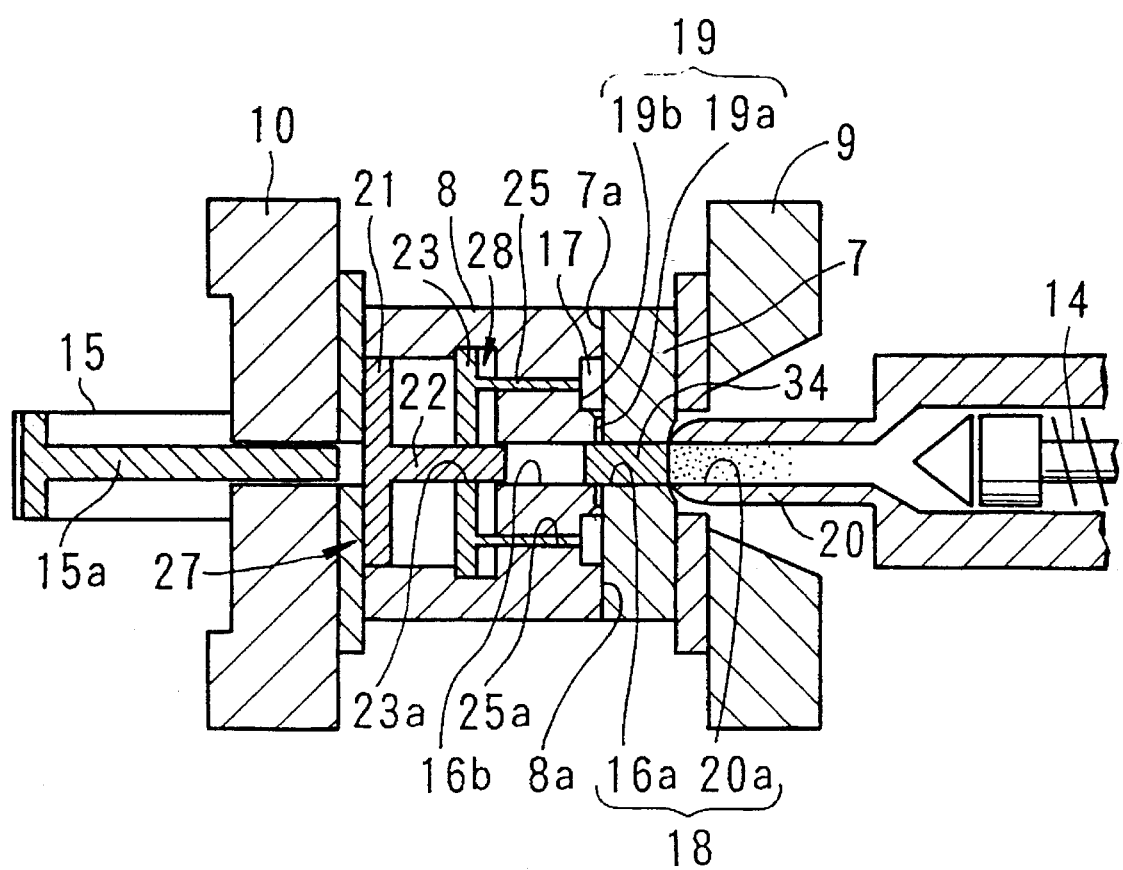
FIG. 2 is a cross sectional view of the main section of the apparatus shown in FIG. 1, and corresponds to an initial state before beginning the injection step.

First, as shown in FIG. 2, in the stand-by condition of the injection apparatus before injection of the resin in which the fixed mold 7 is in contact with the movable mold 8, the reciprocating member 34 is in the back position as a result of the completion of the previous cycle, and the operation of the moving device 27. In this condition, the action pin 22 is made to be farthest removed from the fixed mold 7 and is also remote from the reciprocating member 34 by means of the moving device 27.

Figure 3:
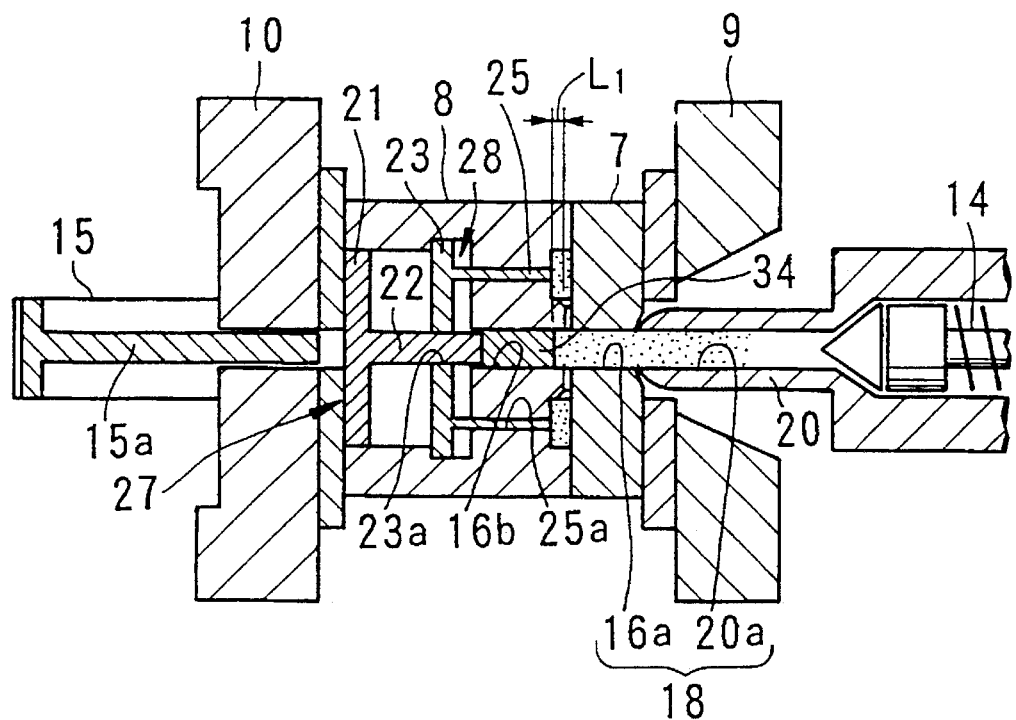
FIG. 3 is a cross sectional view of the main section of the apparatus shown in FIG. 1, and corresponds to a state of performing the injection step.

In this condition, when the injection device 2 is operated, the screw 14 injects molten resin from the nozzle 20 of the heating cylinder 6 by the action of the injection cylinder 5. Then, as shown in FIG. 3, the reciprocating member 34 moves to the injection position by the force of the injected molten resin, and contacts the action pin 22 of the moving device 27. In this condition, the molten resin passages 16b, 18 are communicated with the mold cavity 17, and the molten resin fills the mold cavity 17.

In the meantime, suppose that the screw position is being selected as the trigger for initiating the pushing of the reciprocating member 34, then the timing timer 56 inputs the position signal in CPU 51 via the switcher 58 and the comparator 59. Then, the switcher 58 switches the connection so that it can receive the signal from the screw position setting device 57.

The comparator 59 receives a signal indicating that the reciprocating member 34 started the pushing step from the screw position setting device 57, and a signal to indicate the position of the screw from the screw position sensor 60. These signals are compared, and when the measured position signal from the screw position sensor 60 becomes coincident with the set position signal from the screw position setting device 57, the comparator 59 outputs a signal to CPU 51. Upon receiving this signal, CPU 51 outputs signals to the setting switching section 50 and to output device 62 to start pushing the reciprocating member 34.

In addition, if the trigger for the timing timer 56 to initiate pushing the reciprocating member 34 is chosen to be the measurement of the injection time or a combination of both, then, instead of the steps described above or in addition to these steps, measurements of the injection time are carried out.

The output device 62 energizes the forward solenoid of the em valve 37. At the same time, the setting switching section 50 selects an input signal from the ejector forward speed setting device 47a (at the time of the pushing step) and an input signal from the ejector pressure setting device 49 (at the time of the pushing step), and forwards these signals to the em flow control valve 42 and the em relief valve 43, respectively. By so doing, the flow volume in the hydraulic circuit and the fluid pressure for pushing of the reciprocating member 34 are determined, and the speed of the ejector 15a by the eject cylinder 15 is determined in accordance with the speed of the pushing of the reciprocating member 34.

Figure 4:
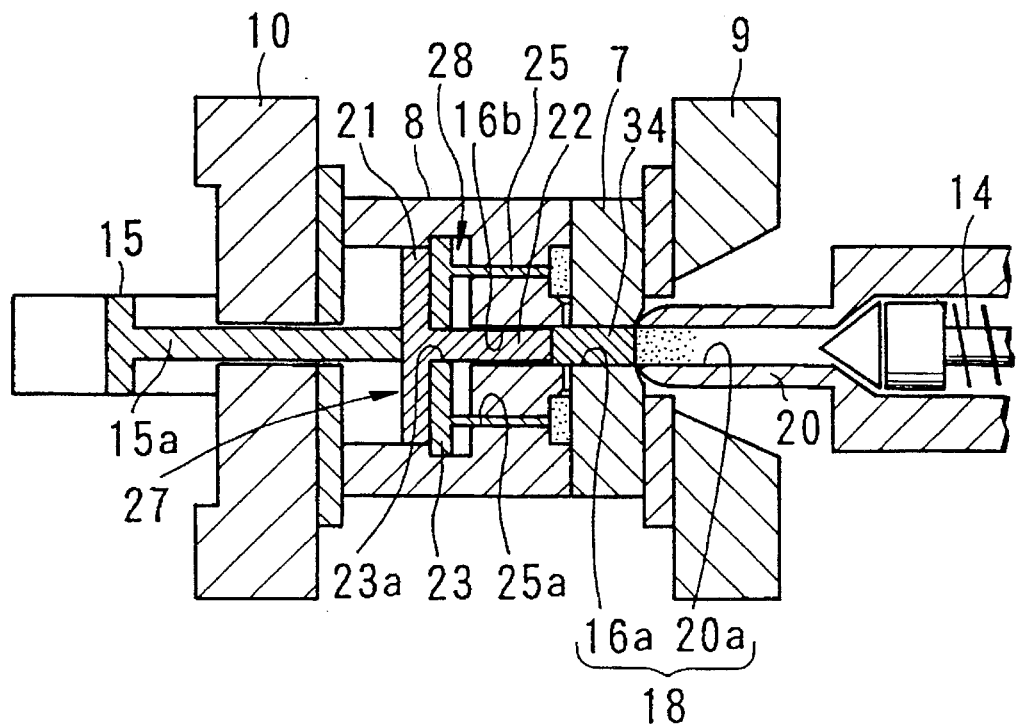

When the injection process is completed, as shown in FIG. 4, the pressure is applied to the eject cylinder 15 of the moving device 27 to advance the piston a given amount, so as to move the action pin 22 towards the fixed mold 7, and the first ejection plate 21 to about touch the second ejection plate 23. This moves the reciprocating member 34 towards the fixed mold 7, and places the reciprocating member 34 in the back position. By so doing, the residual resin which existed inside the molten resin passages 16b, 18 is returned towards the screw 14.

Figure 5:
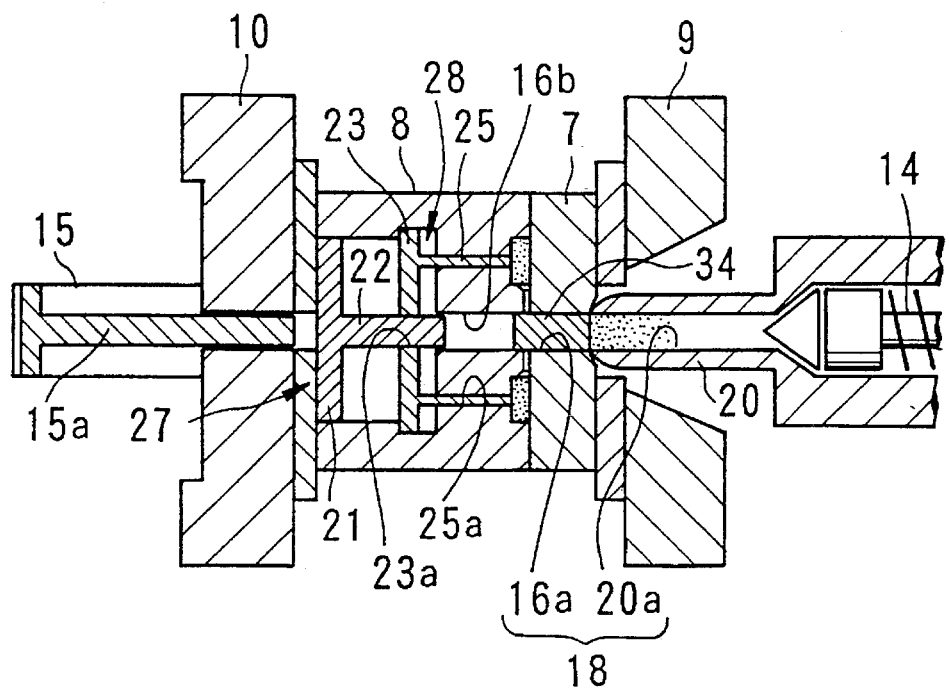
FIG. 5 is a cross sectional view of the main section of the apparatus shown in FIG. 1, and corresponds to a state after the transfer device has moved to the initial position after pushing in the movable member.

Next, when a specific duration measured by the push timer 61 (for measuring the duration of pushing of the reciprocating member 34) has passed, the forward solenoid 37a of the em valve 37 is de-energized, and the reverse solenoid 37b is energized. At the same time, the setting switching section 50 receives signals from the reverse speed setting device 47b and the pressure setting device 49, and the ejector 15a is reversed at a certain speed and pressure. The first election plate 21 and the action pin 22 move away from the fixed mold 7, and are moved to the initial position as shown in FIG. 5. The reciprocating member 34 is retained in the back position.

After a certain period of cooling, the movable mold 8 is separated from the fixed mold 7, as shown in FIG. 6. The reciprocating member 34 is retained in the back position in the fixed mold 7. The result is that the molten resin passage 18 in the fixed mold 7 is sealed by the reciprocating member 34.

When the mold opening step is completed, CPU 51 outputs a signal via the output device 62 to energize the forward solenoid 37a of the em valve 37 again. Also, the setting switching section 50 determines the speed and the pressure in the hydraulic circuit in accordance with the signals from the forward speed setting device 46a (at the time of molded product ejection) and from the ejector pressure setting device 48 (at the time of molded product ejection), and the determined values are forwarded to the em flow control device 42 and the em relief valve 43, respectively. By so doing, the ejector 15a is operated, and the first ejection plate 21 is moved at a relatively low speed through a long stroke, and the second ejection plate 23 is moved together with the first ejection plate 21.

Thus, the ejection pins 25 protrude into the mold cavity 17, and the molded product 24 is removed from the mold cavity 17.

In the first embodiment, the flow volume and the pressure in the ejection cylinder 15 are automatically selected, however, it is also permissible to manually set the flow volume and the pressure to be used separately for pushing the reciprocating member and ejecting the molded product by judicious combination of throttling valves, pressure reduction valves and em valves, as necessary.

As presented above, the first embodiment of the injection apparatus enable to eliminate residual resin from the molten resin passages 16b, 18, by arranging the reciprocating member 34 to be freely movable within the molten resin passages 16b, 18, and operating the apparatus so that during the injection step, the reciprocating member 34 moves into the injection position in the movable mold 8 by the force of the molten resin being injected by the screw 14 into the mold cavity 17. After the injection process is completed, the reciprocating member 34 is moved no the back position by the action of the moving device 27 towards the fixed mold 7, thereby returning the residual resin inside the molten resin passages 16b, 18 towards the screw 14.

In this design of the reciprocating member 34, it is freely and independently movable inside the molten resin passages 16b, 18. Therefore, after the completion of the injection step and when the molds 7, 8 are separated, and the molten resin passages 16b, 18 are closed by the reciprocating member 34 left in the fixed mold 7 (moved by the moving device 27).

Therefore, it is possible to prevent leaking of molten resin from the openings of the molten resin passages 16b, 18, and to prevent burning in the molded product caused by the accumulation of unwanted air.

Also, the moving device 27 moves the reciprocating member 34 to a position to enable the residual resin left in the molten resin passages to be returned reliably to the nozzle section 20 to be melted. Therefore, there is no danger of solid resin residues left in the passages, thus enabling to continuously perform the injection operation.

In this case, it is permissible to arrange so that the reciprocating member 34 is moved inside the nozzle section 20 by the moving device 27. This design allows not only returning of the residual resin inside the nozzle to be melted, but also allows the reciprocating member 34 to be heated so that any resin films adhering to the reciprocating member 34 can also be melted to keep the reciprocating member 34 moving freely.

Also, when the reciprocating member 34 is in the injection position, it is disposed away from the screw 14 by a distance L1 from the opening of the molten resin passage to the mold cavity 17. Therefore, the temperature of the molten resin which is in contact with the reciprocating member 34 is lowered, and the resin may sometimes solidify. However, because the solidified resin exists in the region away from the opening of the molten resin passages to the mold cavity 17 (of the movable mold 8), there is no danger of the solidified resin blocking the communication of the screw 14 with the mold cavity 17.

Furthermore, the moving device 27 performs the dual function of operating the ejection cylinder 15 as well as the ejection device 28. This design allows reduction in the number of components necessary, and thus to lower the production cost.

A second embodiment of the injection apparatus is shown in FIGS. 10 to 13. This design permits the application of the concept of the first embodiment to those injection apparatus which do not have an ejection device.

The injection apparatus of the second embodiment differ from the injection apparatus of the first embodiment in that it is provided with a moving device 27 but is not provided with an ejection device (i.e. the second ejection plate, ejection pins and the holes therefor). Those components which are the same as those in the first embodiment are given the same reference numbers, and their explanations are omitted.

In the first embodiment, the speed and pressure of the pushing step of the ejector 15a (determined by the operating fluid volume and pressure in the ejection cylinder 15) and the ejection of the molded product 24 can be set separately and individually. The values can be selected appropriately to suit the required speed of the action pin 22.

Figure 14:
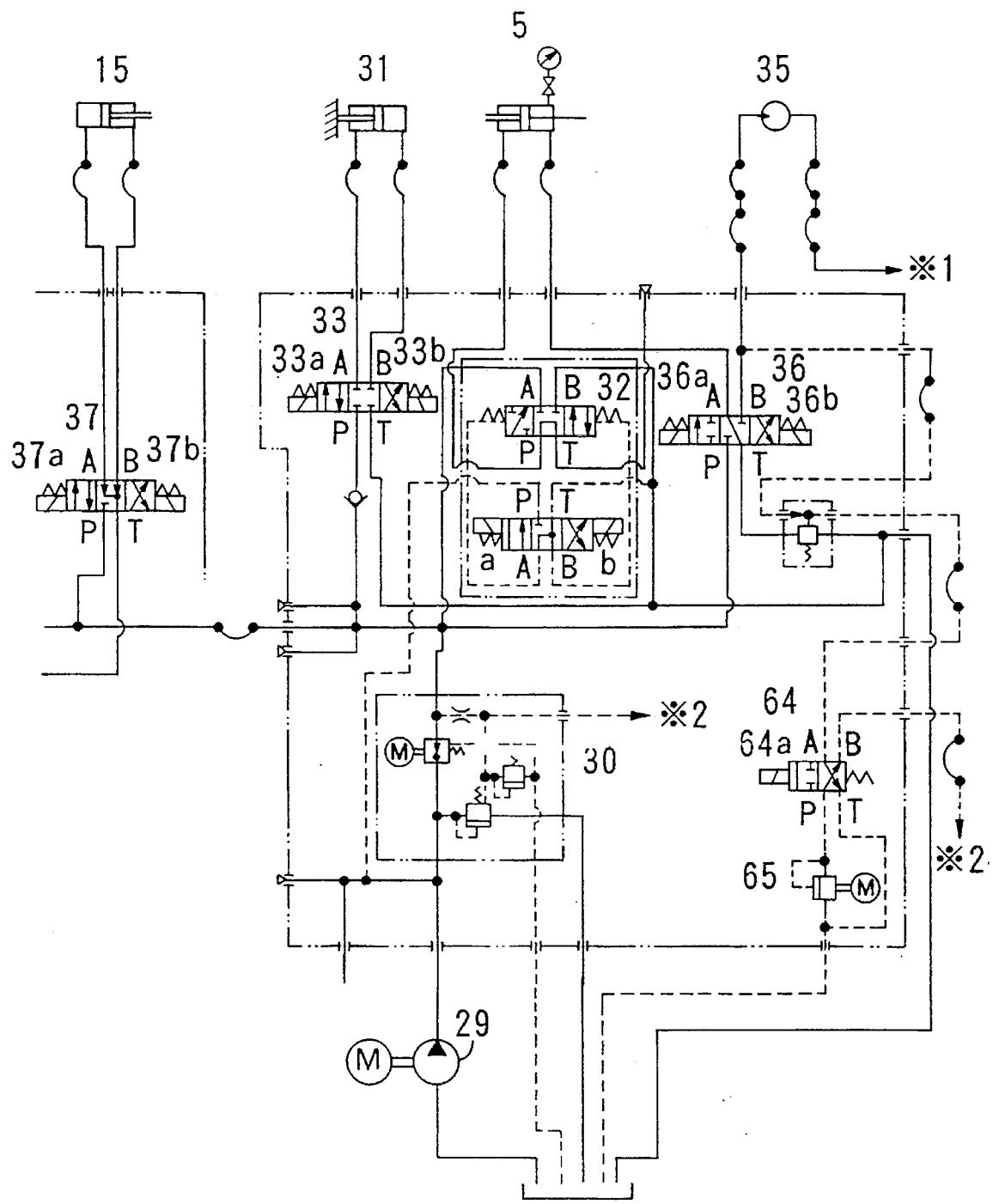
FIG. 14 shows the main elements of the fluid pressure circuit of the control device for a third embodiment of the injection apparatus.
Figure 15:
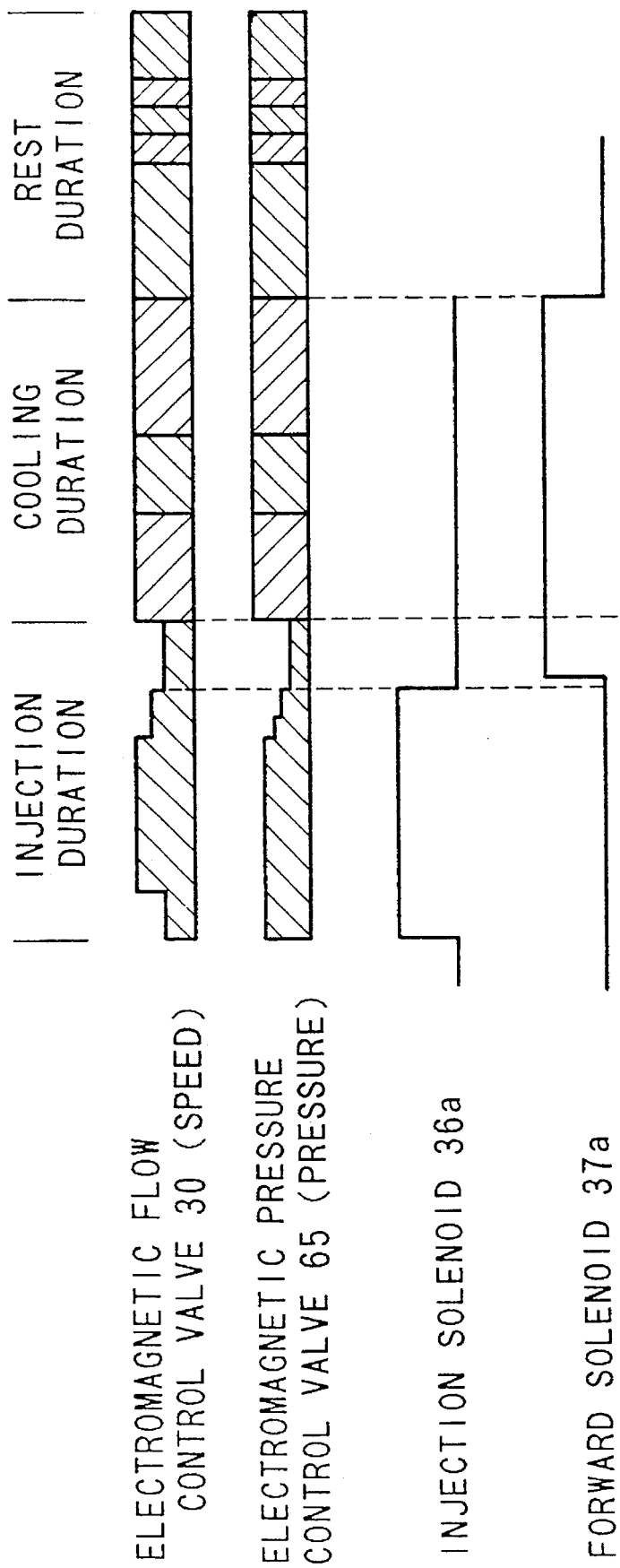
FIG. 15 shows a timing chart for an injection solenoid and a forward solenoid in the electromagnetic valves operating during the injection step in the third embodiment.

The second embodiment can be modified as shown in FIGS. 9, 14 and 15 to produce a third embodiment.

In FIG. 14, unlike in the first embodiment, the control section 38 is not connected to the hydraulic circuit for the ejection cylinder 15. Instead of using the control section 38, the hydraulic circuit for the ejection cylinder 15 is connected to a fluid path downstream to the em fluid flow control valve 30.

In the conventional injection apparatus, the speeds and pressures of the actuators of the injection cylinder 5 during the injection step are controlled in multi-levels by the operation of the em flow control valve 30 and the em pressure control valve 65, as shown in FIG. 9. However, it is not common that the same speeds and pressures are used throughout the entire process of injection. The speeds and pressures of the em flow control valve 30 and the em pressure control valve 65, during the final stages of injection (i.e filled mold cavity), are not used because the injection stage is completed.

Therefore, in the third embodiment shown in FIG. 15, during the final stages of filling the mold cavity, the ejection solenoid 36a of the em valve 36 is de-energized, and after a certain time lag, the forward solenoid 37a of the em valve 37 for the ejection cylinder 15 is energized.

By so doing, the speeds and pressures of the em flow control valve 30 and the em pressure control valve 65 for controlling the injection cylinder 5, which existed during the final stages of injection, are applied to the ejection cylinder 15. This type of operation enable the pushing speed of operation of the ejector 15a for pushing of the reciprocating member 34 to be set higher than that of the ejection speed for the molded product.

In the third embodiment, the operating conditions for the ejection cylinder 15 by the em flow control valve 30 and the em pressure control valve 65 are set at four-levels (though single level is also permissible), and the reciprocating member 34 are operated under the same condition as those during the final stages of injection. However, when the operating conditions for the injection cylinder are set at multi-levels, the operating conditions for the reciprocating member, after the mold cavity is filled, can also be set at multi-levels.

For example, in a multi-level setting, the two settings can be used to control injection process, and the remaining two levels can be used to control the ejector when the reciprocating member is to be pushed.

The control actions for the above type of operation can be performed by a CPU according to the timing chart shown in FIG. 15.

In the third embodiment, the control action for the ejector 15a has been simplified by reducing the number of selectable operating conditions, for example, by controlling the ejector 15a in accordance with the operational values of the em flow valve 30 and the em pressure control valve 65 at the time of completion of the injection stage. Therefore, compared with the first embodiment, the need for new control sections is reduced without sacrificing the performance of the injection apparatus. The manufacturing cost is reduced and the need for additional spaces is controlled.

The need to push molten resin into the nozzle section 20 during the operation the reciprocating member is satisfied by the following arrangement.

In a fourth embodiment, as in the third embodiment, it is possible to control the operating speeds for the ejector 15a during the pushing step of the reciprocating member 34 by de-energizing the injection solenoid 36a of the em valve 36, during the duration of the injection step, and after a certain time lag, the forward solenoid 37a for the eject cylinder 15 is energized.

In the above case, the pressure on the resin in the mold cavity 17 and the molten resin passage 26 is reduced by de-energizing the injection solenoid 36a of the em valve 36 and providing a time lag t. After the time lag t, the forward solenoid 37a is energized to push the reciprocating member 34 under the conditions of near zero pressure in various parts of the resin.

The operation of de-energizing of the injection solenoid 36a and energizing of the forward solenoid 37a after the time lag t are controlled by CPU.

Figure 16:
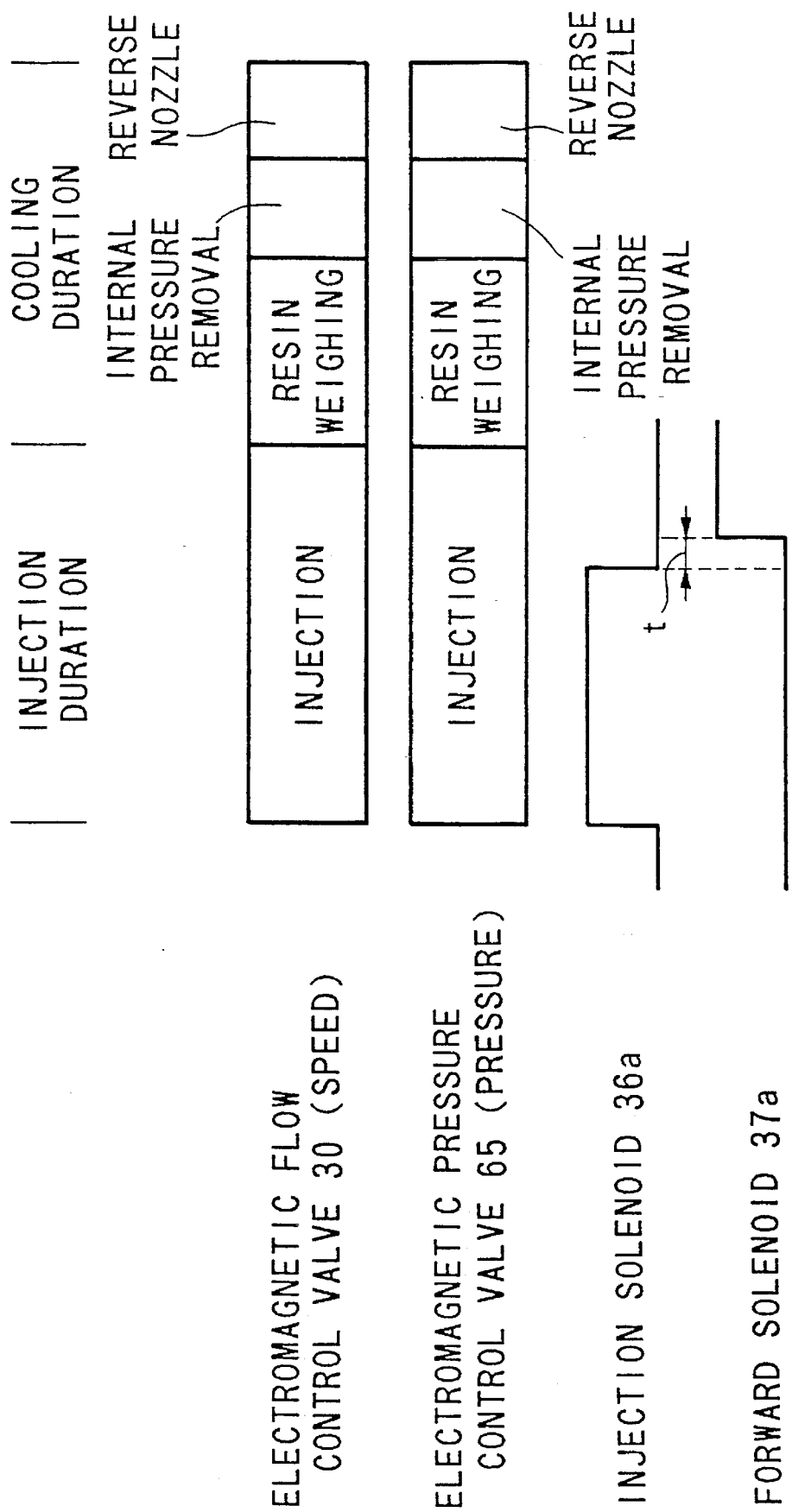
FIG. 16 shows a timing chart for each actuator during the push in step in a fourth embodiment.
Figure 17:
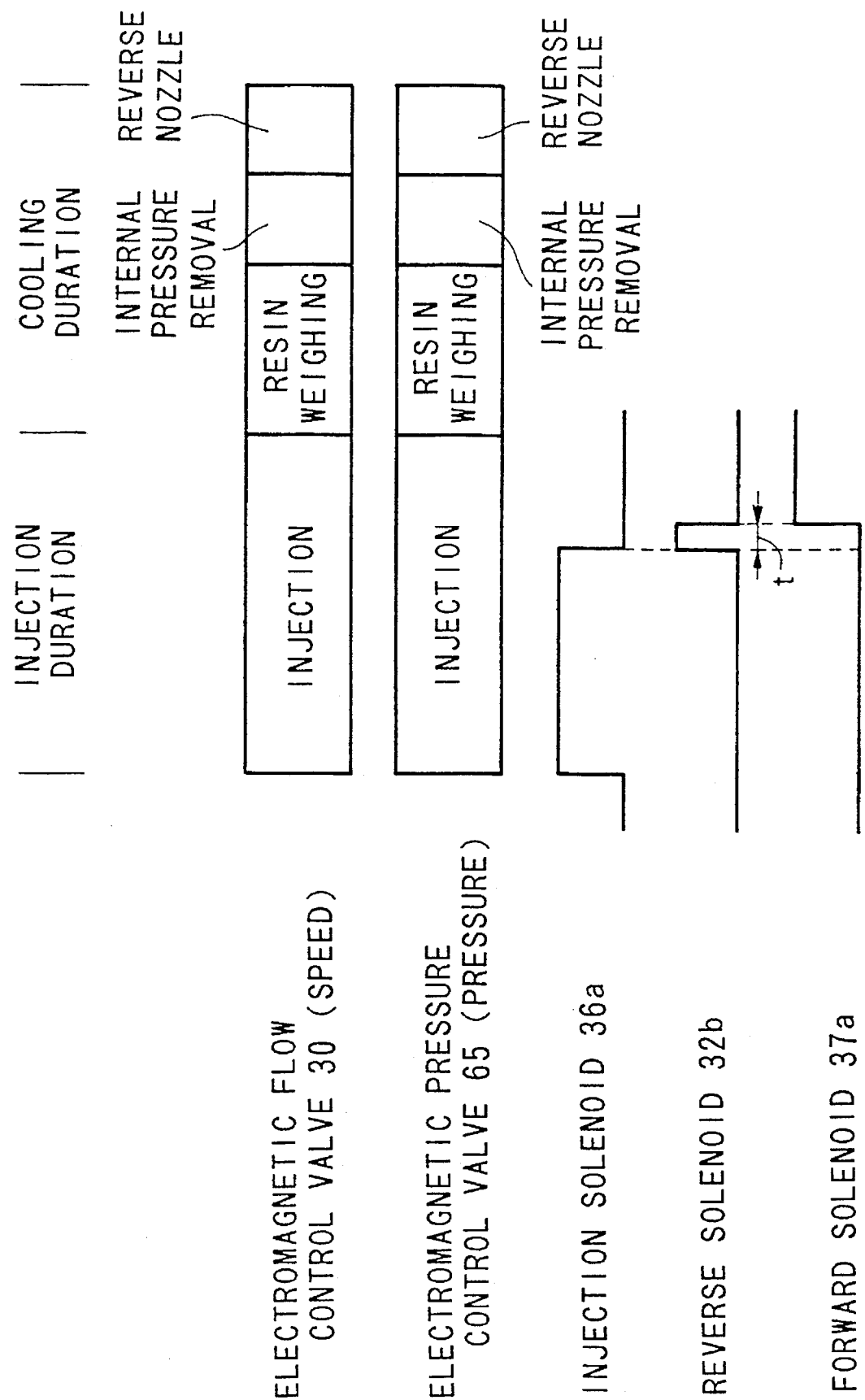
FIG. 17 shows a first variation in the timing chart in the fourth embodiment.

A first variation of the fourth embodiment is shown in FIG. 17. In addition to the actions shown in FIG. 16, de-energizing of the injection solenoid 36a and energizing of the forward solenoid after the time lag t, the reverse solenoid 32b for the em valve 32 for controlling the injection cylinder 5 can be energized after the time lag t. In this case, the reverse solenoid 32b permits the screw 14 to be retracted without rotation.

Therefore, the screw 14 in the heating cylinder 6 can reverse without rotation, and the resin pressure inside the nozzle section 20 becomes negative, and this is advantageous because the residual resin inside the molten resin passages 16b, 18 can be readily returned to the nozzle section 20 by the action of the reciprocating member 34.

Figure 18:
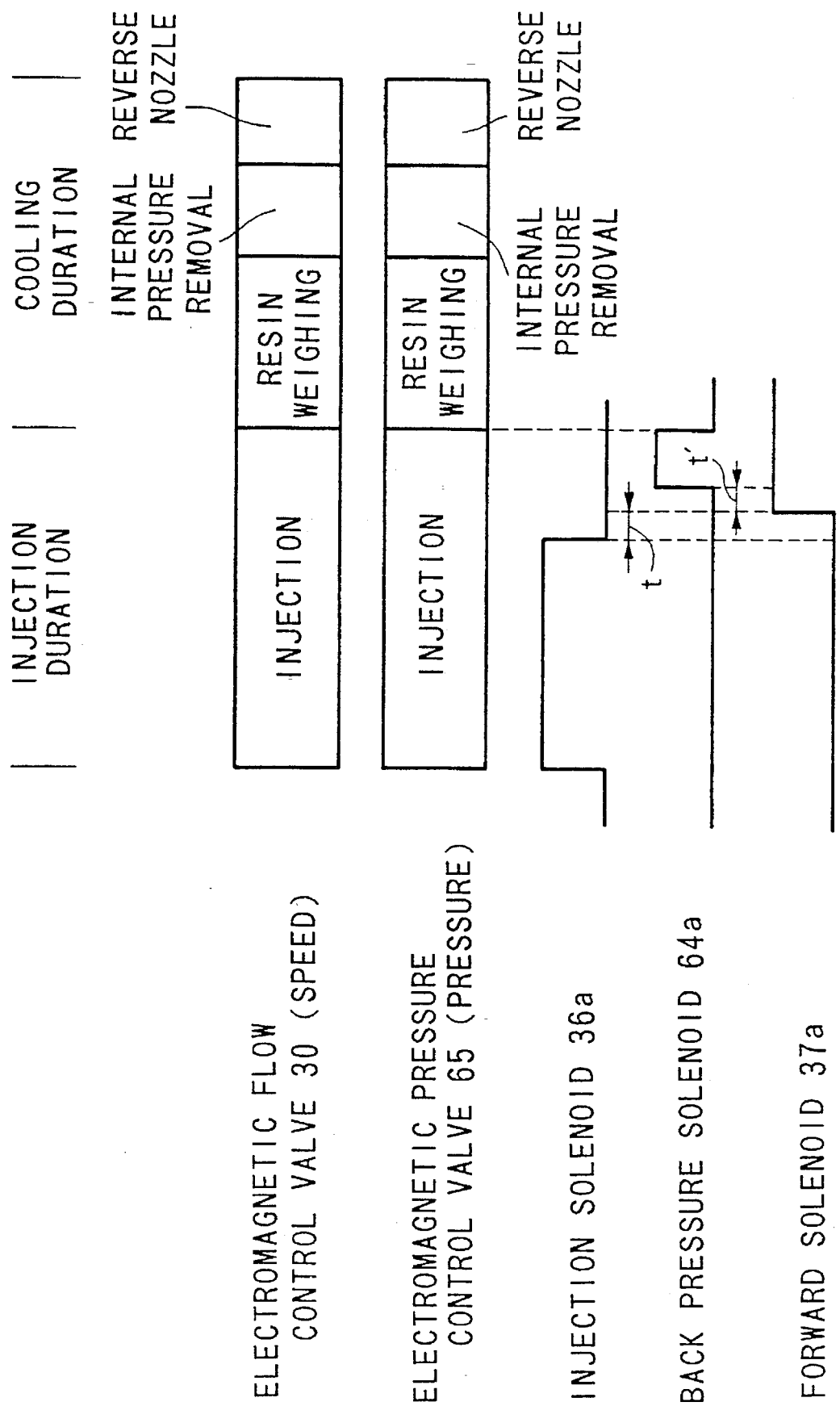
FIG. 18 shows a second variation in the timing chart in the fourth embodiment.

A second variation of the fourth embodiment is as follows. As shown in FIG. 18, it is permissible to arrange so that in addition to de-energizing the injection solenoid 36a and energizing of the forward solenoid 37a shown in FIG. 16, the injection cylinder 5 can be given a back pressure, after a time lag t', by activating the back pressure solenoid 64a of the back pressure valve 64.

In this arrangement, the residual resin inside the molten resin passages 16b, 18 is returned to the nozzle section 20 by the action of the reciprocating member 34, but at the same time, during the time interval t', a back pressure is generated inside the heating cylinder 6 by the injection cylinder 5, leading to a low positive pressure being applied to the residual resin inside the molten resin passages 16b, 18. The result is an increase in the resin density inside the molten resin passages 16b, 18. This variation therefore provides a benefit that the unwanted by-products is easily removable, in addition to the benefits already explained that rejects are reduced and the mold life is prolonged.

The inventions presented in FIGS. 16 to 18 have been explained in relation to the configuration of the third embodiment, but this invention is not limited to such a configuration. It is applicable to other types of injection systems, including conventional systems.

In principle, any configuration can be used so long as it permits the injection solenoid 36a to be de-energized, and after a time lag t, the forward solenoid 37a to be energized so as to control the action of the ejector 15a.

According to the four embodiments presented, because the unwanted by-products can be made smaller, therefore, a system can be devised to recycle the unwanted by-products. For example, unwanted particles of less than about 8 mm sizes for mid-sized injection machine and unwanted particles of less than about 5 mm for a small sized injection machines, can be charged into the channels of the screw 98 in a hopper 99, shown in FIG. 19 without pulverizing the unwanted by-products. Therefore, the unwanted by-products can be used directly as feed to the injection apparatus.

Figure 19:
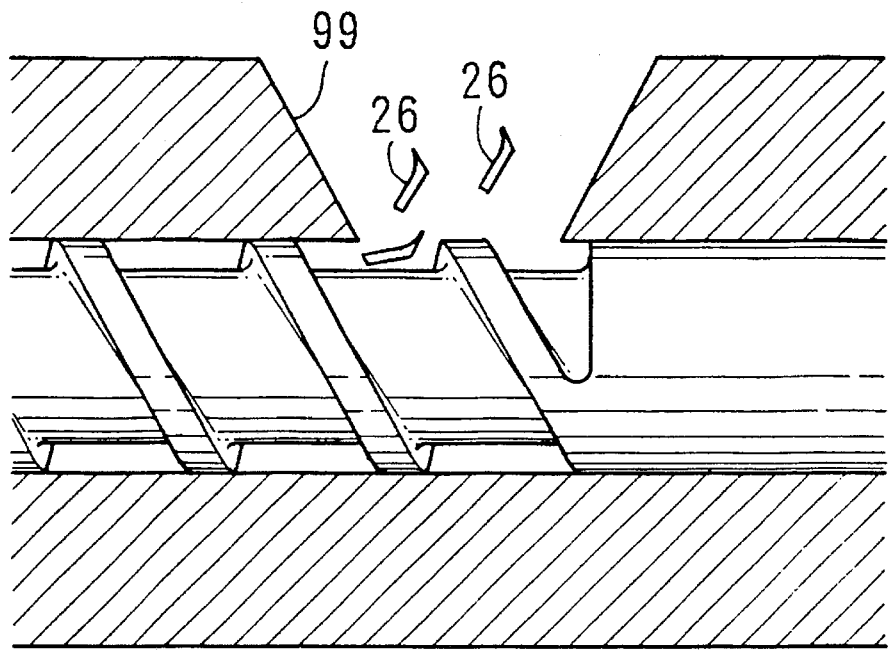
FIG. 19 shows an example of an arrangement of the hopper and the waste materials.
Figure 20:
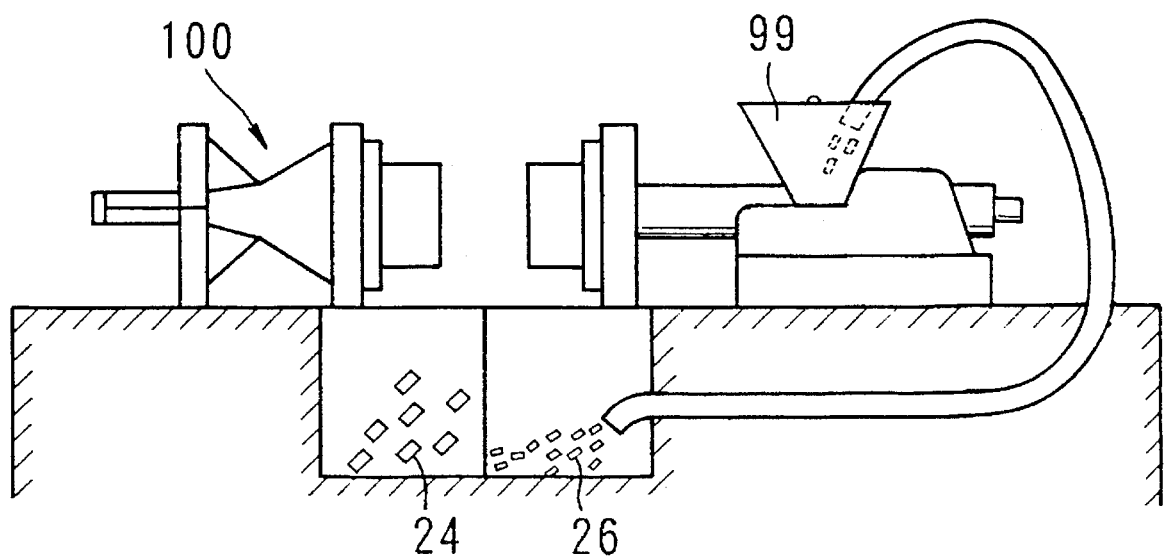
FIG. 20 is a schematic illustration of an example of recycling of waste materials based on the embodiments of the present invention.

This arrangement, in combination with an apparatus (disclosed in a Japanese Patent Application, First Publication, H5-177674, "Method for separating sprues and runners from molded products in injection molding apparatus"), will produce a recycling forming apparatus 100, shown in FIG. 19, for recycling the unwanted by-products 26 into the hopper 99 of an injection apparatus 2, to produce only the final molded products 24.

What is claimed is:

1. A synthetic resin product forming apparatus for making molded resin products by delivering molten resin to a separable mold cavity including a first mold and a separable second mold, an injection device communicating with said first mold through a molten resin passage provided in said first mold, comprising a moving device having:

means for extending said molten resin passage to said second mold;

means for coupling an independent reciprocating member inside said molten resin passage, wherein said reciprocating member moves between an injection position functioning to communicate said mold cavity with said molten resin passage, located in said second mold, and a back position wholly or partially located on said first mold;

means for moving said reciprocating member to said pack position;

wherein said reciprocating member is disposed wholly or partially in said first mold when said first mold is separated from said second mold so as to remove a molded resin product from said mold cavity; and said reciprocating member, when placed in said injection position, is positioned inside said second mold and is disposed away from an opening of said molten resin passage to said mold cavity opposite to said injection device.

2. A synthetic resin product forming apparatus for making molded resin products by delivering molten resin to a separable mold cavity including a first mold and a separable second mold, an injection device communicating with said first mold through a molten resin passage provided in said first mold, comprising a moving device having:

means for extending said molten resin passage to said second mold;

means for coupling an independent reciprocating member inside said molten resin passage, wherein said reciprocating member moves between an injection position functioning to communicate said mold cavity with said molten resin passage, located in said second mold, and a back position wholly or partially located on said first mold;

means for moving said reciprocating member to said back position;

wherein said reciprocating member is disposed wholly or partially in said first mold when said first mold is separated from said second mold so as to remove a molded resin product from said mold cavity; and said reciprocating member is positioned so as to close an opening of a further passage, formed by said first mold and said second mold, to said mold cavity when said reciprocating member is placed in said back position.

3. A synthetic resin product forming apparatus for making molded resin products by delivering molten resin to a separable mold cavity including a first mold and a separable second mold, an injection device communicating with said first mold through a molten resin passage provided in said first mold, comprising a moving device having:

means for extending said molten resin passage to said second mold;

means for coupling an independent reciprocating member inside said molten resin passage, wherein said reciprocating member moves between an injection position functioning to communicate said mold cavity with said molten resin passage, located in said second mold, and a back position wholly or partially located on said first mold;

means for moving said reciprocating member to said back position;

wherein said reciprocating member is disposed wholly or partially in said first mold when said first mold is separated from said second mold so as to remove a molded resin product from said mold cavity; and said apparatus is provided with an ejection device, operated together with said moving device, which projects ejector pins into said mold cavity for separating molded products from said mold cavity, and a speed of returning said reciprocating member to said first mold is controlled by said moving device and is different than a speed of projecting said ejector pins into said mold cavity controlled by said ejection device.

4. A synthetic resin product forming apparatus for making molded resin products by delivering molten resin to a separable mold cavity including a first mold and a separable second mold, an injection device communicating with said first mold through a molten resin passage provided in said first mold, comprising a moving device having:

means for extending said molten resin passage to said second mold;

means for coupling an independent reciprocating member inside said molten resin passage, wherein said reciprocating member moves between an injection position functioning to communicate said mold cavity with said molten resin passage, located in said second mold, and a back position wholly or partially located on said first mold;

means for moving said reciprocating member to said back position;

wherein said reciprocating member is disposed wholly or partially in said first mold when said first mold is separated from said second mold so as to remove a molded resin product from said mold cavity; and said apparatus is provided with an ejection device, operated together with said moving device, which projects ejector pins into said mold cavity for separating molded products from said mold cavity, and said moving device and said ejection device comprise a cylinder and a first ejection plate operated by said cylinder, wherein a transitional movement of said cylinder causes said first ejection plate to abut said reciprocating member to return said reciprocating member to said first mold, as well as to abut a second ejection plate having said ejector pins to product said ejection pins into said mold cavity.

5. An apparatus as claimed in claim 1, wherein said reciprocating member is positioned so as to close said opening of said molten resin passage to said mold cavity when said reciprocating member is placed in said back position.

6. An apparatus as claimed in claim 1, wherein said apparatus is provided with an ejection device, operated together with said moving device, which projects ejector pins into said mold cavity for separating molded products from said mold cavity, and a speed of returning said reciprocating member to said first mold is controlled by said moving device and is different than a speed of projecting said ejector pins into said mold cavity controlled by said ejection device.

7. An apparatus as claimed in claim 1, wherein said apparatus is provided with an ejection device, operated together with said moving device, which projects ejector pins into said mold cavity for separating molded products from said mold cavity, and said moving device and said ejection device comprise a cylinder and a first ejection plate operated by said cylinder, wherein a transitional movement of said cylinder causes said first ejection plate to abut said reciprocating member to return said reciprocating member to said first mold, as well as to abut a second ejection plate having said ejector pins to product said ejection pins into said mold cavity.

8. An apparatus as claimed in claim 5, wherein said apparatus is provided with an ejection device, operated together with said moving device, which projects ejector pins into said mold cavity for separating molded products from said mold cavity, and a speed of returning said reciprocating member to said first mold is controlled by said moving device and is different than a speed of projecting said ejector pins into said mold cavity controlled by said ejection device.

9. An apparatus as claimed in claim 5, wherein said apparatus is provided with an ejection device, operated together with said moving device, which projects ejector pins into said mold cavity for separating molded products from said mold cavity, and said moving device and said ejection device comprise a cylinder and a first ejection plate operated by said cylinder, wherein a transitional movement of said cylinder causes said first ejection plate to abut said reciprocating member to return said reciprocating member to said first mold, as well as to abut a second ejection plate having said ejector pins to product said ejection pins into said mold cavity.

10. An apparatus as claimed in claim 6, wherein said moving device and said ejection device comprise a cylinder and a first ejection plate operated by said cylinder, wherein a transitional movement of said cylinder causes said first ejection plate to abut said reciprocating member to return said reciprocating member to said first mold, as well as to about a second ejection plate having said ejector pins to project said ejection pins into said mold cavity.

11. An apparatus as claimed in claim 8, wherein said moving device and said ejection device comprise a cylinder and a first ejection plate operated by said cylinder, wherein a transitional movement of said cylinder causes said first ejection plate to abut said reciprocating member to return said reciprocating member to said first mold, as well as to abut a second ejection plate having said ejector pins to product said ejection pins into said mold cavity.

12. An apparatus as claimed in claim 2, wherein said apparatus is provided with an ejection device, operated together with said moving device, which projects ejector pins into said mold cavity for separating molded products from said mold cavity, and a speed of returning said reciprocating member to said first mold is controlled by said moving device and is different than a speed of projecting said ejector pins into said mold cavity controlled by said ejection device.

13. An apparatus as claimed in claim 2, wherein said apparatus is provided with an ejection device, operated together with said moving device, which projects ejector pins into said mold cavity for separating molded products from said mold cavity, and said moving device and said ejection device comprise a cylinder and a first ejection plate operated by said cylinder, wherein a transitional movement of said cylinder causes said first ejection plate to abut said reciprocating member to return to said reciprocating member to said first mold, as well as to abut a second ejection plate having said ejector pins to project said ejection pins into said mold cavity.

14. An apparatus as claimed in claim 12, wherein said moving device and said ejection device comprise a cylinder and a first ejection plate operated by said cylinder, wherein a transitional movement of said cylinder causes said first ejection plate to abut said reciprocating member to return said reciprocating member to said first mold, as well as to abut a second ejection plate having said ejector pins to product said ejection pins into said mold cavity.

15. An apparatus as claimed in claim 3, wherein said moving device and said ejection device comprise a cylinder and a first ejection plate operated by said cylinder, wherein a transitional movement of said cylinder causes said first ejection plate to abut said reciprocating member to return said reciprocating member to said first mold, as well as to abut a second ejection plate having said ejector pins to product said ejection pins into said mold cavity.

16. An apparatus as claimed in any one of claims 3, 6, 8, 10, 11, 12, 14, or 15, wherein a speed for returning said reciprocating member to said first mold is no less than a speed for projecting said ejector pins into said mold cavity.

17. An apparatus as claimed in any one of claims 1, to 15, wherein said apparatus is provided with an injection cylinder for injecting a molten resin into said mold cavity through said molten resin passage, and an internal pressure of said molten resin is reduced to approximately zero when said moving device is returning said reciprocating member to said first mold.

18. Apparatus as claimed in claim 16, wherein said apparatus is provided with an injection cylinder for injecting a molten resin into said mold cavity through said molten resin passage, and an internal pressure of said molten resin is reduced to approximately zero when said moving device is returning said reciprocating member to said first mold.

19. An apparatus as claimed in any one of claims 1 to 15, wherein said apparatus is provided with an injection cylinder for injecting a molten resin into said mold cavity through said molten resin passage, and an internal pressure of said molten resin is reduced to a negative pressure when said moving device is returning said reciprocating member to said first mold.

20. An apparatus as claimed in claim 16, wherein said apparatus is provided with an injection cylinder for injecting a molten resin into said mold cavity through said molten resin passage, and an internal pressure of said molten resin is reduced to a negative pressure when said moving device is returning said reciprocating member to said first mold.

21. An apparatus as claimed in any one of claims 1 to 15, wherein said reciprocating member forms a passage portion in said molten resin passage communicating with said mold cavity, resulting that unwanted by products of a size of not more than 8 mm are formed in said passage portion.

22. An apparatus as claimed in claim 16, wherein said reciprocating member forms a passage portion in said molten resin passage communicating with said mold cavity, resulting that unwanted by-products of a size of not more than 8 mm are formed in said passage portion.

23. An apparatus as claimed in claim 17, wherein said reciprocating member forms a passage portion in said molten resin passage communicating with said mold cavity, resulting that unwanted by-products of a size of not more than 8 mm are formed in said passage portion.

24. An apparatus as claimed in claim 18, wherein said reciprocating member forms a passage portion in said molten resin passage communicating with said mold cavity, resulting that unwanted by-products of a size of not more than 8 mm are formed in said passage portion.

25. An apparatus as claimed in claim 19, wherein said reciprocating member forms a passage portion in said molten resin passage communicating with said mold cavity, resulting that unwanted by-products of a size of not more than 8 mm are formed in said passage portion.

26. An apparatus as claimed in claim 20, wherein said reciprocating member forms a passage portion in said molten resin passage communicating with said mold cavity, resulting that unwanted by-products of a size of not more than 8 mm are formed in said passage portion.

* * * * *